Patented Nov. 11, 1952

2,617,805

UNITED STATES PATENT OFFICE 2,617,805

PROCESS OF PRODUCING NICOTINAMIDE

Lennard J. Wissow, Plainfield, N. J., assignor to Merck & Co., Inc., Rahway, N. J., a corporation of New Jersey No Drawing. Application March 15, 1950, Serial No. 149,891

2 Claims. (Cl. 260—295.5)

This invention relates to the preparation of organic acid amides, more particularly to the preparation of nicotinamide, and specifically to an improved method of preparing nicotinamide in enhanced yields.

Nicotinic acid and/or nicotinamide, important members of the group of B-vitamins, are used in large quantities as components in multiple vitamin compositions, and specifically in the treatment of human and animal pellagra. The use of nicotinamide in the treatment of human pellagra is preferred since it leads to a lower incidence of side reactions than is obtained when nicotinic acid is administered. However, the preparation of nicotinamide economically and in a high state of purity has proven to be a very difficult problem.

Various methods have been proposed for preparing nicotinamide. In one such procedure, β-cyano pyridine is selectively hydrolyzed to produce nicotinamide. In another method, nicotinic acid esters are treated with aqueous or alcoholic ammonia to produce the amide. It has also been proposed to obtain nicotinamide by passing gaseous ammonia through nicotinic acid at elevated temperatures to remove the water of reaction formed in the process. However, all of these known methods suffer from the disadvantages that they are uneconomical, and that the nicotinamide obtained must be subjected to extensive purification procedures in order to obtain a product suitable for therapeutic purposes.

For example, in the process of producing nicotinamide by bringing a stream of dry ammonia gas into contact with nicotinic acid at elevated temperatures, the reaction product contains only about 60% of nicotinamide, the remaining 40% consisting of unreacted nicotinic acid, ammonium nicotinate and various colored decomposition products. Consequently, it is necessary to subject this crude reaction product to complex purification procedures in order to recover the nicotinamide in a form suitable for therapeutic use. In addition, the ammonium nicotinate must be decomposed to nicotinic acid, and the nicotinic acid recovered and recycled to the process. Also, this process of continually passing a stream of dry ammonia gas through the reaction mixture is very wasteful, necessitating the use of large amounts of ammonia and a complex recovery system for drying and recovering the ammonia before it is reused in the process.

It is an object of this invention to provide a means of converting nicotinic acid to nicotinamide economically and in enhanced yields. It is a further object to provide a means of obtaining nicotinamide in relatively pure form thus eliminating the need for any extensive purification procedures. Another object of this invention is to provide a process for making nicotinamide which utilizes inexpensive and readily available equipment and raw materials. Further objects will be apparent from the detailed disclosure herein provided.

In accordance with my invention, I have found that nicotinic acid is economically converted to nicotinamide in high yields by heating the acid in contact with a molar excess of ammonia at elevated temperatures and superatmospheric pressures in the presence of a small amount of water. This is most readily accomplished under conditions whereby water of reaction is permitted to remain in the reaction mixture until the reaction is completed. Under these conditions I have found that it is possible to obtain reaction products which contain up to 96–99% of nicotinamide, and essentially no colored decomposition products which usually result from prior art methods. If a purer form of nicotinamide is desired, my reaction products are readily purified to obtain such products by methods known in the art.

In the process of preparing nicotinamide by reacting ammonia with nicotinic acid, the mechanism of the reaction may be expressed in the following equation:

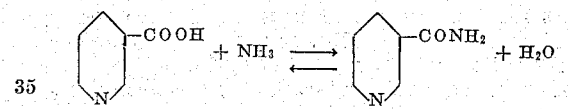

It is postulated in this reaction that the acid first reacts with the ammonia to form ammonium nicotinate which at elevated temperatures is decomposed to the amide and water. As indicated above, it had been previously considered necessary to continuously remove the water of reaction as it was formed in order to prevent the reverse hydrolysis of the amide to nicotinic acid and ammonia.

It is therefore indeed surprising and completely unexpected that the process of my invention comprising the heating of nicotinic acid and ammonia in the presence of water, results in the conversion of 75% or more of the nicotinic acid to nicotinamide. In contrast to this, the prior art indicated that a yield of only 60% of nicotinamide was obtainable even when ammonia gas was used to remove the water of reaction as it was formed. Further, in contrast to the prior art methods wherein the crude nicotinamide produced was very dark in color as a result of the formation of large amounts of tarry decomposition products, the nicotinamide obtained by my process is almost white in color indicating that essentially no decomposition has occurred. The absence of these tarry decomposition products in the nicotinamide obtained by my process facilitates considerably any subsequent purification and in addition results in an enhanced yield of nicotinamide.

It is essential in carrying out my invention to employ an amount of ammonia which is in excess over the one mol theoretically required for the reaction. Thus, the molar ratio of ammonia to nicotinic acid may be varied although I presently prefer to use an ammonia to nicotinic acid molar ratio of at least two. Frequently, to achieve a maximum yield of nicotinamide I use an ammonia to acid molar ratio of about four or greater in carrying out my process. Even this amount of ammonia is substantially less than that required in the prior method wherein large quantities of gaseous ammonia are used to remove the water of reaction formed. In the present process, although any excess of ammonia remaining after completion of the amidation reaction can be recovered and recycled to the process, it is often more economical to simply discard the small amount of excess ammonia.

Further, in accordance with my invention I have found that the temperature at which this reaction is carried out is important for obtaining high yields of the amide. The general temperature range suitable in my process is about 175–300° C. Temperatures below 175° C. result in lower yields, while temperatures in excess of 300° C. result in some destruction of the nicotinic acid and/or nicotinamide. Although good results are obtained at all temperatures within the range of 175–300° C., I find that temperatures of about 200–270° C. are eminently suited for obtaining maximum yields.

The pressure used in the reaction will vary depending upon the temperature, quantity of reactants, and size of the pressure vessel employed. In general, I have found that pressures in excess of about 500 lbs. per square inch are most satisfactory. Below about 500 lbs. the yield of nicotinamide may be found to be somewhat lower and it is preferred to employ pressures somewhat in excess of 500 lbs. to achieve the best results. In actual practice, I have found that pressures of 800 lbs. or greater are particularly suitable in my process and result in the obtainment of yields approaching the theoretical under optimum conditions.

The time required for completion of the reaction will, of course, depend upon the temperatures, pressures and/or amount of reactants employed. Usually I find that operating within the preferred range of temperature, namely 200–270° C., the reaction will be complete in less than 5 hours.

In a preferred embodiment of my process, I find that optimum yields of nicotinamide are obtainable by carrying out the reaction in a plurality of stages. In this variation, after the initial reaction of ammonia and nicotinic acid is completed, the reaction mass is cooled, excess ammonia and the water of reaction are wholly or partially removed, and the resulting mixture of nicotinamide, ammonium nicotinate, and nicotinic acid is again brought into contact with ammonia and heated under the previously described conditions. For example, by heating one mol of nicotinic acid and eight mols of ammonia at 200° C., under a pressure of about 1000 lbs./sq. in., for five hours, it is found that about 75% of the acid is converted to the amide. By repeating the heating of the mixture of nicotinamide, ammonium nicotinate, and nicotinic acid with an additional quantity of ammonia, it is found that the reaction product contains 95% to 99% of nicotinamide. Generally, there does not appear to be much advantage in carrying out the process in more than two stages, since by subsequent reactions only a minor improvement in the yield of nicotinamide is obtained.

In carrying out my process in practice, I find that it is conveniently effected by adding the required amounts of nicotinic acid and liquid ammonia to a pressure resistant vessel which is then sealed and the reactants heated to the desired temperatures for a time sufficient to permit completion of the reaction. At this point, the excess of ammonia and water of reaction are removed and the nicotinamide recovered. If desired, the nicotinamide so obtained can be purified in accordance with methods known in the art. For example, my reaction product may be purified by dissolving it in a lower aliphatic alcohol, adding a small amount of calcium oxide to cause precipitation of insoluble calcium nicotinate, removing this precipitated salt by filtration, and evaporating the filtrate to dryness to recover the nicotinamide. Alternatively, the amide is recovered by extracting my reaction product with a solvent such as ethyl acetate from which the nicotinamide can be crystallized. Similarly, other methods known in the art can be employed to recover the nicotinamide.

One of the outstanding advantages of my improved process is the substantial absence of any decomposition products of the reaction in the nicotinamide produced. In the prior art methods for preparing nicotinamide from nicotinic acid, it was found that the reaction product contained considerable amounts of tarry decomposition products which resulted from the decarboxylation of nicotinic acid. Consequently, low yields of nicotinamide were obtained and it was necessary to use complex purification procedures to recover the nicotinamide. In my improved method however, substantially no decomposition occurs as is evidenced by the high yields of nicotinamide obtained and the absence of any colored impurities in my reaction product.

It will be obvious from the foregoing detailed description that another advantage of my present process is the relatively simple equipment which is necessary. The major item of equipment which is needed, is a pressure vessel of suitable size which will withstand the pressures and temperatures employed in the process. As indicated previously, in the event that it is desired to recover the excess of ammonia, a small system for this purpose is readily installed. The remainder of the equipment necessary for recovering the nicotinamide in substantially pure form is conveniently available in chemical laboratories and/or manufacturing plants.

The following examples are presented to illustrate my invention:

*Example 1*

12.3 grams (0.1 mol.) of nicotinic acid and 20 ml. (0.8 mol.) of anhydrous liquid ammonia were charged to a 300 ml. stainless-steel pressure reactor containing a glass liner. The mixture was heated to 200° C., and maintained at that temperature for 5 hours, with the reactor sealed. A pressure of about 1000 lbs./sq. in. developed.

At the end of the heating period, the reactor was cooled and vented, the solid product was dissolved in methanol, and benzene was added. The solution was concentrated to dryness to remove water. The residue was then dissolved in isopropanol, 3 grams of calcium oxide was added, the precipitate of calcium nicotinate (formed from ammonium nicotinate and any nicotinic acid present) was removed by filtration, and the filtrate was concentrated to dryness. There remained a residue of nicotinamide, 9 grams (73%), M. P. 128–129° C.

*Example 2*

25 grams (0.2 mol.) of nicotinic acid and 40 ml. (1.6 mol.) of liquid ammonia were charged to a 1350 ml. stainless-steel pressure reactor containing a glass liner. The mixture was heated to 250° C., and maintained at that temperature for 5 hours. A pressure of about 800 lbs./sq. in. developed.

At the end of the heating period, the reactor was cooled and vented. The solid product was removed and dried at 60° C. in vacuo. The dried solid was extracted 4 hours with 200 ml. of ethyl acetate in a Soxhlet extractor. On cooling the extract, nicotinamide crystallized and was removed by filtration. After drying at 60° C., in vacuo, there was obtained 20.5 g. of nicotinamide, M. P., 125–127° C. The mother liquors were concentrated to about 1/20 volume, and additional nicotinamide crystallized, 1.3 g. M. P., 123–125° C. The total yield was 87.8% of theoretical. The residue remaining after extraction was dried to give 2.6 g. (9.1%) of ammonium nicotinate, M. P., 170–173° C.

*Example 3*

12.3 grams (0.1 mol.) of nicotinic acid and 20 ml. (0.8 mol.) of liquid ammonia were reacted in a 300 ml. reactor for 5 hours at 200° C.; a pressure of about 1000 lbs./sq. in. developed. At the end of the heating period, the reactor was cooled to 60° C., vented, and dried in vacuo for ½ hour. 20 ml. of liquid ammonia was again added to the reactor, and the 5-hour heating period at 200° C. was repeated. The reaction vessel was then cooled and vented. The solid product was removed and dried at 60° C. in vacuo.

The dried solid was extracted 4 hours with 100 ml. of ethyl acetate in a Soxhlet extractor. Nicotinamide was recovered from the ethyl acetate by crystallization in two crops: 10.7 grams, M. P., 127–129° C., and 1.0 gram, M. P., 125–127° C. The total yield was 96% of theoretical. The residue remaining after extraction was dried to give 0.30 gram (2.14%) of ammonium nicotinate, M. P., 172–176° C.

*Example 4*

The reaction procedure of Example 3 was repeated, and the reaction product was dried in the reactor by heating at about 60° C., in vacuo after the second treatment with ammonia. A third 20 ml. quantity of liquid ammonia was added to the reactor, and the 5-hour heating period at 200° C. was repeated. After the cooling, venting, and drying steps, the dried solid was extracted 4 hours with 100 ml. of ethyl acetate in a Soxhlet extractor. Nicotinamide was recovered from the ethyl acetate by crystallization in two crops: 10.55 grams, M. P., 128–130° C. and 1.5 grams, M. P., 124–126° C. The total yield was 98.9% of theoretical. The residue remaining after extraction was dried to give 0.13 gram (0.92%) of ammonium nicotinate, M. P., 172–175° C.

*Example 5*

25 grams (0.2 mol.) nicotinic acid and 40 ml. (1.6 mol.) of liquid ammonia were reacted in a 1350 ml. reactor for 2 hours at 250° C. A pressure of about 800 lbs./sq. in. developed. At the end of the heating period the reactor was cooled to 60° C., vented, and evacuated for 0.5 hours. 40 ml. of liquid ammonia was again added to the reactor, and the 2-hour heating period at 250° C. was repeated. The product was obtained as in previous examples: 22.62 grams, M. P., 125–127° C., and 1.43 grams, M. P., 122–125° C. The total yield was 97.2% of theory. The recovery of ammonium nicotinate was 0.79 gram (2.8%), M. P., 169.5–172.5° C.

*Example 6*

69.3 grams (0.563 mole) of nicotinic acid and 55.4 ml. (2.25 moles) of liquid ammonia were charged to a 300 ml. stainless-steel pressure reactor containing a glass liner. The mixture was heated to 250° C. and maintained at that temperature for 2 hours. A pressure of about 3050 lbs./sq. in. developed.

At the end of the heating period, the reactor was cooled and vented. The solid product was removed and dried at 60° C., in vacuo. The dried solid was dissolved in 525 ml. of absolute ethanol, and 3.75 g. of calcium oxide was added. The mixture was agitated and refluxed for 1 hour, agitated at room temperature for 2 hours, and filtered through diatomaceous earth. To the filtrate was added 2.25 g. of activated charcoal, and the mixture was filtered, concentrated to 195 ml., and cooled to 5° C. After cooling for 3 hours at 5° C., the crystalline nicotinamide that formed was removed by filtration and dried; yield, 46.8 g. (68.6%). Two additional crops of crystals were obtained on further concentration to provide an overall yield of 83.9% of nicotinamide, M. P., 129–131° C.

The diatomaceous earth filter cake was treated with 135 ml. of 1 N sulfuric acid, to pH 3.3, and the mixture was heated and filtered. The filtrate was decolorized with activated charcoal, concentrated until calcium sulfate precipitated, and filtered hot. On cooling at room temperature for 4 hours, nicotinic acid crystallized and was removed and dried; yield, 6.2 g. (9%), M. P., 230–232° C. Additional crops of crystals were obtained on further concentration, to give a total recovery of 14.2% nicotinic acid.

*Example 7*

The procedure of Example 3 was repeated with the following changes: 25 g. (0.2 mol.) of nicotinic acid and 20 ml. (0.8 mol.) of liquid ammonia were reacted in a 1300 ml. reactor for 1 hour 270° C., and at a pressure of 600 lbs./sq. in. The second treatment with 20 ml. of ammonia was of 1 hour duration at 270° C. The first crop yield of nicotinamide was 83.5% of theoretical, M. P., 126–128.5° C. A second crop of 10.9% was obtained, to provide a total yield of 94.4% of theoretical. The ammonium nicotinate recovery was 4.2%.

Various changes and modifications may be made in my invention, certain preferred embodiments of which are herein described, without departing from the scope thereof. It is my intention that such changes and modifications, to the extent that they are within the scope of the ap-

I claim:

1. The process for producing nicotinamide in enhanced yield by reaction of ammonia and nicotinic acid that comprises bringing ammonia into contact with nicotinic acid in a sealed vessel, at a temperature within the range of 200-270° C., and under a pressure of at least 800 lbs. per square inch, the molar ratio of ammonia to nicotinic acid being about 8 to 1, and carrying out said reaction in the presence of water of reaction.

2. In the process for producing nicotinamide by reaction of ammonia and nicotinic acid, the step which comprises bringing ammonia, under a pressure of at least 800 lbs. per square inch, and nicotinic acid together in a sealed vessel, at a temperature within the range of 200-270° C., the molar ratio of ammonia to nicotinic acid being about 4 to 1, and continuing said reaction in said sealed vessel in the presence of water of reaction until substantially all of the nicotinic acid is converted to nicotinamide.

LENNARD J. WISSOW.

REFERENCES CITED

The following references are of record in the file of this patent:

UNITED STATES PATENTS

| Number | Name | Date |
| --- | --- | --- |
| 2,427,400 | Garbo | Sept. 16, 1947 |
| 2,453,706 | Garbo | Nov. 16, 1948 |